US009750269B2

(12) United States Patent
Mastroianni et al.

(10) Patent No.: US 9,750,269 B2
(45) Date of Patent: Sep. 5, 2017

(54) HOT AIR POPCORN POPPER

(71) Applicant: Greenfield World Trade, Inc., Ft. Lauderdale, FL (US)

(72) Inventors: Michael R. Mastroianni, Crystal Lake, IL (US); Rong Liu, Vernon Hills, IL (US); Bikram Sohi, Buffalo Grove, IL (US); William A. Bucklew, Wilmette, IL (US)

(73) Assignee: GREENFIELD WORLD TRADE, INC., Ft. Lauderdale, FL (US)

( * ) Notice: Subject to any disclaimer, the term of this patent is extended or adjusted under 35 U.S.C. 154(b) by 241 days.

(21) Appl. No.: 14/280,989

(22) Filed: May 19, 2014

(65) Prior Publication Data

US 2015/0257419 A1 Sep. 17, 2015

Related U.S. Application Data

(60) Provisional application No. 61/952,595, filed on Mar. 13, 2014.

(51) Int. Cl.
*A23L 1/18* (2006.01)
*A23L 7/183* (2016.01)

(52) U.S. Cl.
CPC ............ *A23L 1/1812* (2013.01); *A23L 7/183* (2016.08)

(58) Field of Classification Search
CPC .............................. A23L 1/1812; A23L 7/183
USPC ............................................ 99/323.11, 323.5
See application file for complete search history.

(56) References Cited

U.S. PATENT DOCUMENTS

| 2,922,355 | A |   | 1/1960  | Green |
|-----------|---|---|---------|---------------------------|
| 3,611,910 | A |   | 10/1971 | Hughes |
| 3,697,289 | A | * | 10/1972 | Day et al. ........ A23L 7/187 |
|           |   |   |         | 209/138 |
| 3,722,399 | A |   | 3/1973  | Cole |
| 4,120,236 | A | * | 10/1978 | Blomberg ......... A23L 7/183 |
|           |   |   |         | 99/323.11 |

(Continued)

FOREIGN PATENT DOCUMENTS

CN 2845669 Y 12/2006
GB 2144208 A 2/1985

(Continued)

OTHER PUBLICATIONS

"Hamilton Beach 50754 WaveStation 10-Speed Dispensing Blender", http://www.amazon.com.

(Continued)

*Primary Examiner* — David Angwin
*Assistant Examiner* — Biniam Asmelash
(74) *Attorney, Agent, or Firm* — Shumaker, Loop & Kendrick, LLC; Michael E. Dockins

(57) ABSTRACT

A popcorn popping unit has a heating element and a blower fan, and a cooking surface adapted to receive kernels of corn. The popping unit is configurable for two flow paths of pressurized air through the popping unit. In the first path, pressurized air is configured to flow over the heating element, flow over the cooking surface, cook the kernels of corn, and move the cooked kernels of corn to a serving dispenser. In a second path, pressurized air is configured to flow over the cooking surface, and move un-popped seeds into a seed collection bin.

25 Claims, 15 Drawing Sheets

(56) References Cited

U.S. PATENT DOCUMENTS

| | | | |
|---|---|---|---|
| 4,152,974 A * | 5/1979 | Tienor | A23L 7/183 |
| | | | 99/323.8 |
| 4,178,843 A | 12/1979 | Crabtree et al. | |
| 4,512,247 A | 4/1985 | Friedman | |
| 4,702,158 A | 10/1987 | Ishihara | |
| 4,885,917 A | 12/1989 | Spector | |
| 4,887,909 A | 12/1989 | Bennett | |
| 4,947,740 A | 8/1990 | Strawser et al. | |
| 5,345,784 A | 9/1994 | Bazemore et al. | |
| 5,360,176 A | 11/1994 | Mugge et al. | |
| 5,501,139 A * | 3/1996 | Lee | A23L 7/187 |
| | | | 99/323.5 |
| 5,503,060 A | 4/1996 | Morecroft et al. | |
| 5,551,604 A * | 9/1996 | Kern | A47F 1/03 |
| | | | 222/349 |
| 5,749,288 A | 5/1998 | Skaling | |
| 6,187,353 B1 * | 2/2001 | Wyman | G07F 17/0078 |
| | | | 426/233 |
| 6,460,451 B1 * | 10/2002 | Helman | A23L 7/187 |
| | | | 99/323.5 |
| 7,364,348 B1 | 4/2008 | Jones | |
| 7,371,004 B1 | 5/2008 | Branson, III et al. | |
| 7,703,639 B2 * | 4/2010 | Landau | A47G 19/34 |
| | | | 222/1 |
| D615,347 S | 5/2010 | Garman et al. | |
| D669,304 S | 10/2012 | Bock et al. | |
| 8,276,504 B2 * | 10/2012 | Korin | A23L 7/191 |
| | | | 34/583 |
| 8,529,118 B2 | 9/2013 | Davis et al. | |
| 2002/0176320 A1 | 11/2002 | Wulf et al. | |
| 2005/0047272 A1 | 3/2005 | Sands | |
| 2006/0042472 A1 | 3/2006 | Shore | |
| 2007/0056448 A1 | 3/2007 | Kernan | |
| 2007/0292578 A1 | 12/2007 | Baschnagel | |
| 2008/0031087 A1 | 2/2008 | Pryor | |
| 2009/0186141 A1 | 7/2009 | Almblad et al. | |
| 2011/0076372 A1 * | 3/2011 | Cretors | A23P 30/38 |
| | | | 426/450 |
| 2011/0274804 A1 | 11/2011 | Barrows et al. | |
| 2012/0107469 A1 | 5/2012 | Sands | |

FOREIGN PATENT DOCUMENTS

| | | |
|---|---|---|
| JP | S5712968 A | 1/1982 |
| JP | H03-186234 A | 8/1991 |
| WO | 2006/046268 A1 | 5/2006 |

OTHER PUBLICATIONS

"Margaritaville Blender Jumbo Double Wall Insulated Pitcher", http://www.margaritamachinesdirect.com.

* cited by examiner

HOT AIR POPCORN POPPER

RELATED APPLICATION DATA

This application claims the benefit of provisional application Ser. No. 61/952,595, filed Mar. 13, 2014, the disclosure of which is incorporated by reference herein.

BACKGROUND AND SUMMARY

This application relates to hot air popcorn poppers. The popcorn popper has an on-board storage compartment for storing un-popped kernels of corn. The un-popped kernels of corn may be directed from the storage compartment to cooking surfaces via a seed feeding assembly. The seed feeding assembly may have a metering scoop that provides a desired serving size of kernels. A popping chamber may be arranged around and above the cooking surfaces. Once the kernels are cooked and popped, they may flow into the popping chamber and into a hood assembly arranged at an open end of the popping chamber opposite the cooking surfaces. The popped kernels may exit through an opening in the hood assembly into a dispensing bowl. The popping unit may have a bypass that may be positioned between first and second positions. In the first position, the bypass may be selected such that popped kernels may flow through the popping chamber, to the hood assembly, and to the serving dispenser, for instance, during normal popping operations. In the second position, the bypass may be selected to allow seeds and other uncooked kernels to be removed from the cooking surface to a seed cleaning chamber of the popping unit.

DETAILED DESCRIPTION

Figure 1:
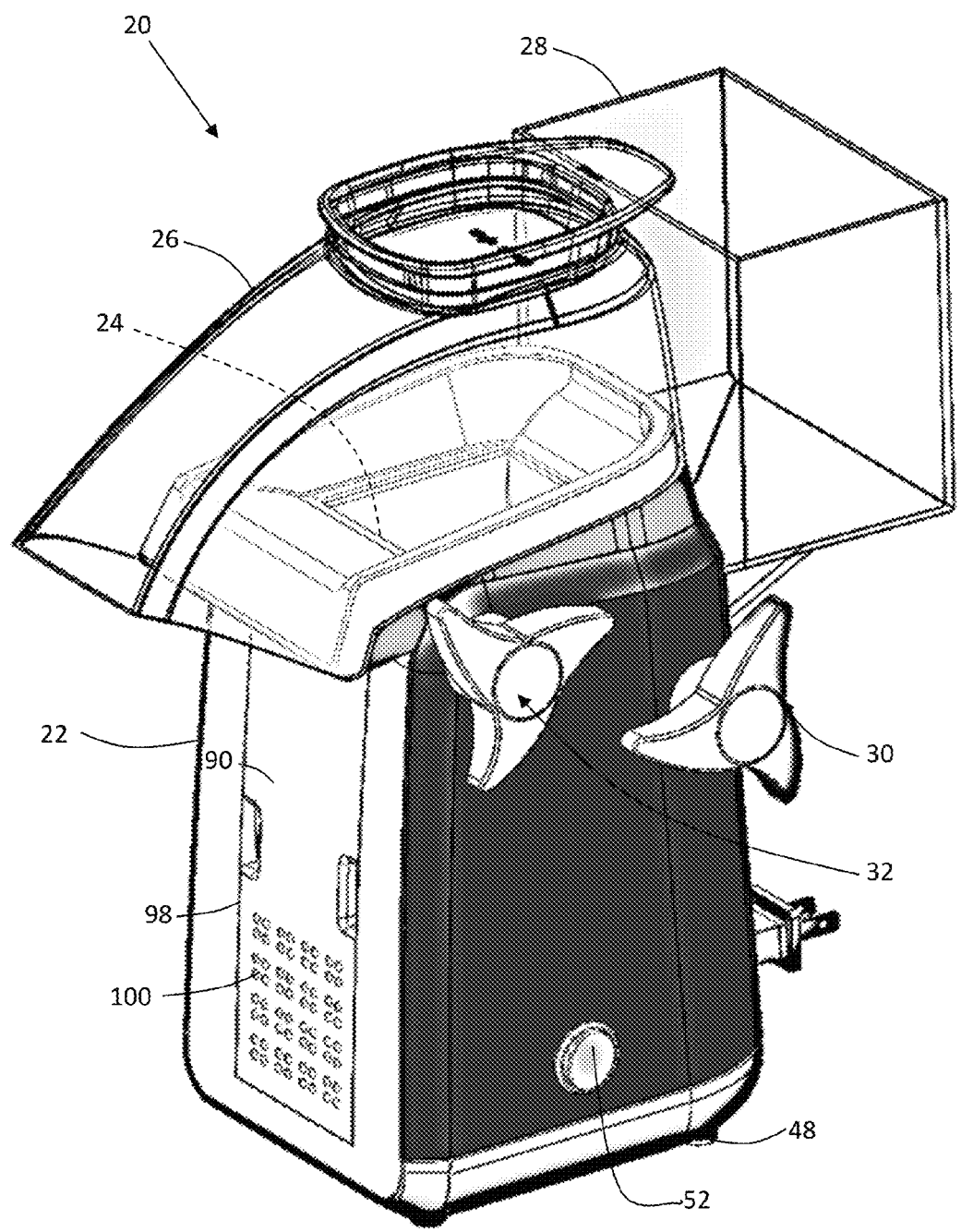
FIG. 1 shows a perspective view of the popping unit.

FIG. 1 illustrates a perspective view of a popping unit 20. The popping unit 20 comprises a housing 22 that houses internal components of the popping unit as will be described later in reference to FIG. 2. The popping unit 20 has a popping chamber 24 which may be arranged within the housing 22. A hood assembly 26 may be positioned at an open top end of the popping chamber and releasably connected therewith and/or the housing 22. A storage compartment 28 for un-popped kernels may be arranged exterior to the housing. A seed feeding assembly 30 may direct un-popped kernels from the storage compartment to cooking surfaces of the popping unit. A seed cleaning assembly 32 may be arranged in the housing interior opposite the seed feeding assembly 30.

Figure 2:
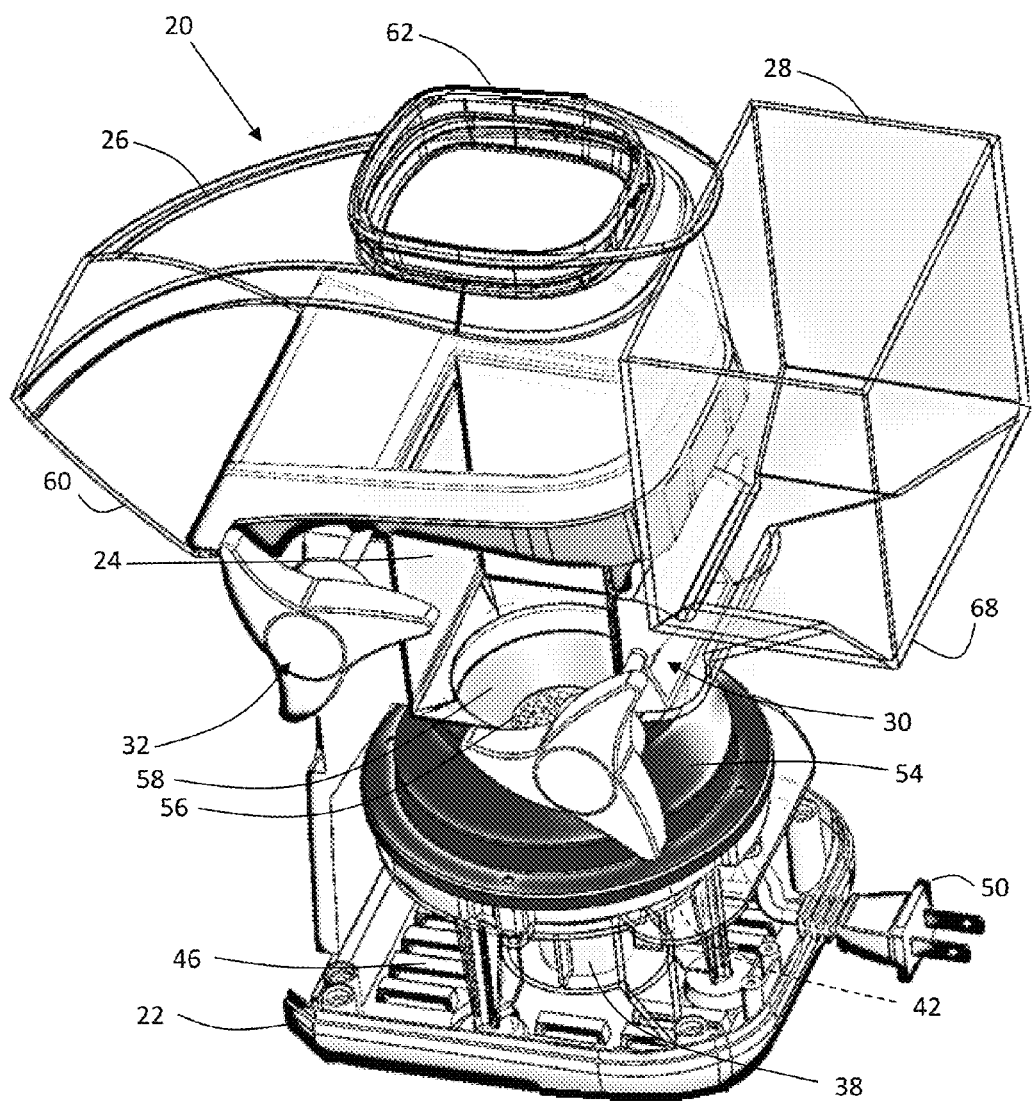
FIG. 2 shows a perspective view of the popping unit of FIG. 1 with a portion of a housing removed to show internal components of the popping unit.

FIG. 2 shows a perspective view of the popping unit 20 with a portion of a housing 22 removed to show internal components of the popping unit. In FIG. 2, a bottom portion of the housing 22 is shown. The housing 22 of the popping unit defines a generally hollow interior. A blower fan assembly 38 and a heating element 42 may be disposed in the hollow interior. Through the action of the blower fan 38, ambient air may be drawn into the hollow interior through openings 46 in the housing. The openings 46 may be formed on a bottom of the housing. The bottom of the housing 22 may be raised off a countertop or support surface by feet (FIG. 1; '48') to allow adequate air to be drawn into the housing interior. The blower fan and/or heating element may be battery powered or powered from a DC power source or external AC power source and/or with a power cord 50. The blower fan and/or heating element may be de-energized with a switch located (FIG. 1; '52') on the housing. In the alternative, the switch may be located on the power cord. The switch may be manual or operated via a timer. A plenum 54 located in an upper part of the housing interior may direct the heated air to a cooking grate 56 and/or cooking surfaces 58 after passing over the heating element. In the upper part of the housing interior, the cooking grate 56 and/or the cooking surface 58 may be provided. Un-popped kernels may be placed on the cooking surface and or grate. The grate may be surrounded with a cooking surface. The cooking surface may comprise a frustra-conical shape with the grate extending across the bottom cooking surface. Un-popped kernels may slide down the cooking surface to the grate. The hot air may exit the plenum and circulate around the cooking surface and pass through the grate, thereby heating the kernels and enabling the kernels to pop. Once the kernels pop, the kernels may expand upward into the popping chamber 24 from the cooking grate and/or cooking surfaces. The pressurized, heated air may flow through the popping chamber to the hood assembly 26 and out through an opening 60 in the hood assembly. The pressurized and heated air may push popped kernels away from the cooking grate and cooking surface into the popping chamber, thereby allowing other un-popped kernels to be positioned on the cooking surface and cooking grate. The heated air has sufficient pressure and velocity to push the popped kernels through the popping chamber and out through the hood assembly into a serving dispenser (not shown) during normal popping operations, as will be described in greater detail below.

The hood assembly 26 may be detachably connected to the open top end of the popping chamber 24. The hood assembly 26 may be formed from a plastic material. The hood assembly may snap across the open top of the popping chamber or may be rotatably connected to the popping chamber at the open top. The hood assembly 26 may have an access 62 with a lid to allow access into the popping chamber with the hood assembly in place. The access lid 62 may comprise a measuring scoop to assist the user in measuring kernels and seasonings that may be sprinkled on the popped kernels in the serving dispenser. The access lid scoop 62 may be detachably connected to the hood assembly 26 for ease of storage and to provide access into the interior of the popping chamber.

The seed storage compartment 28 of the popping unit may be located on the exterior of the popping unit to facilitate filling of the storage compartment and to allow visualization of the level of kernels stored in the compartment. The storage compartment 28 may be located opposite the opening 60 of the hood assembly 26 as shown in the drawings. The storage compartment may be formed from a clear plastic material to allow the user to visualize the level of seeds stored in the storage compartment. The storage compartment may also be located in the hollow interior of the housing and may have a sight glass to indicate the level of kernels in the storage compartment.

Figure 3:
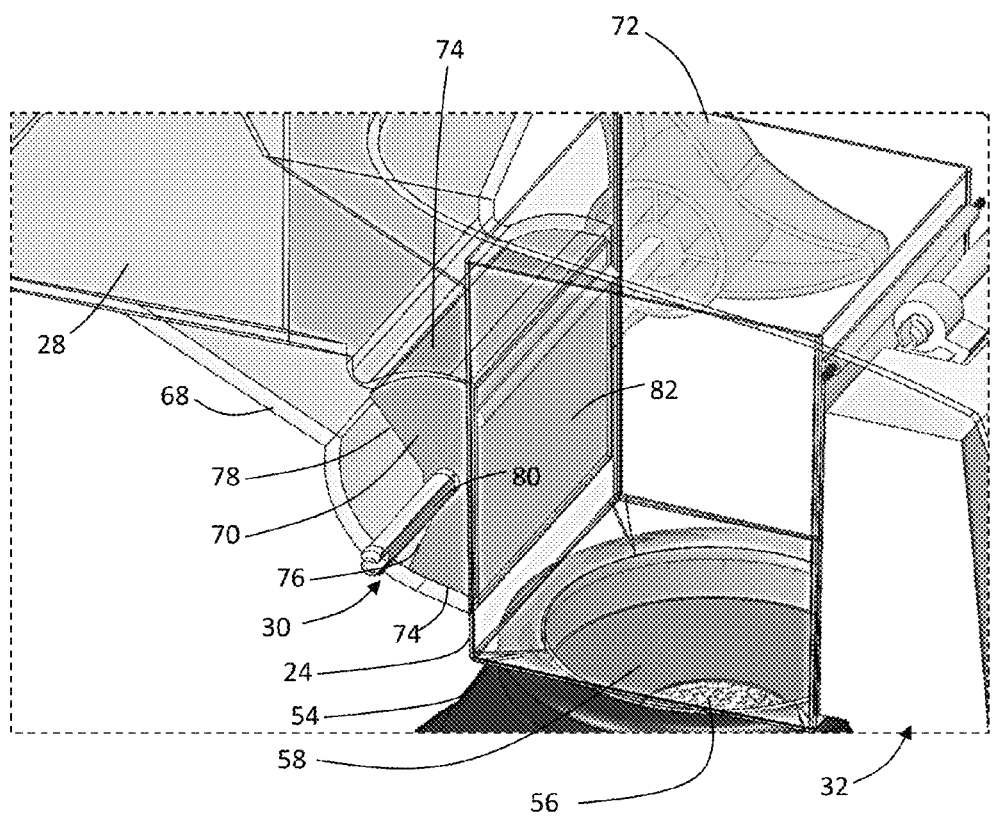
FIG. 3 shows a partial perspective view of a seed feeding assembly of the popping unit.
Figure 4:
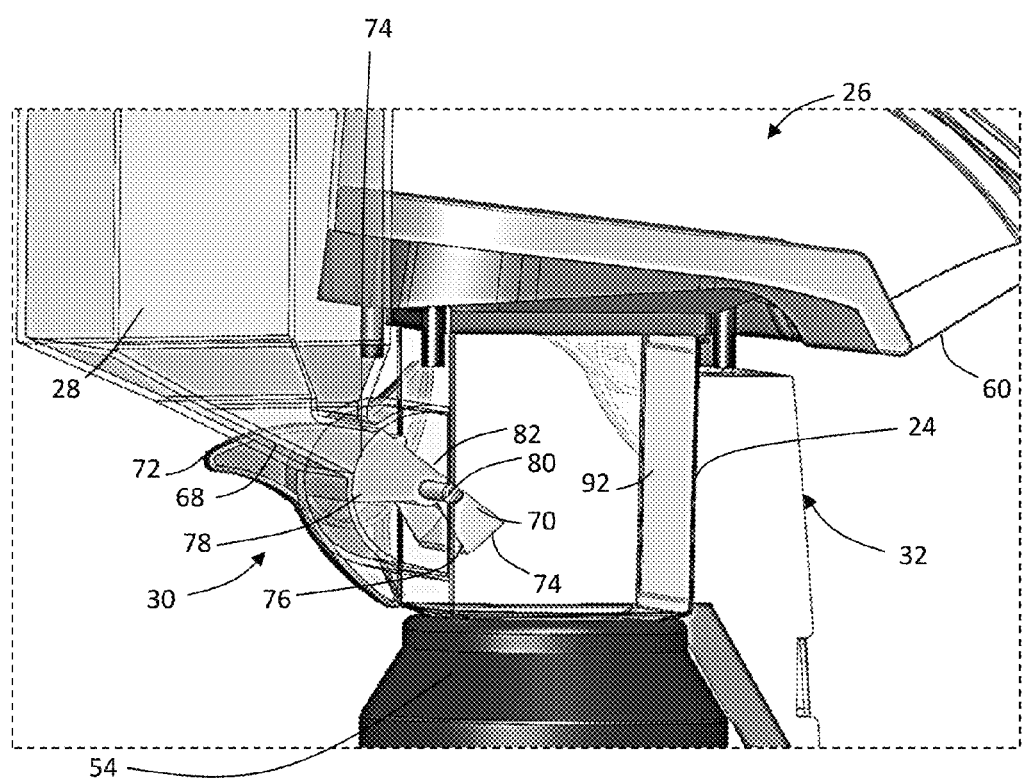
FIG. 4 shows a partial side elevation view of the seed feeding assembly.
Figure 5:
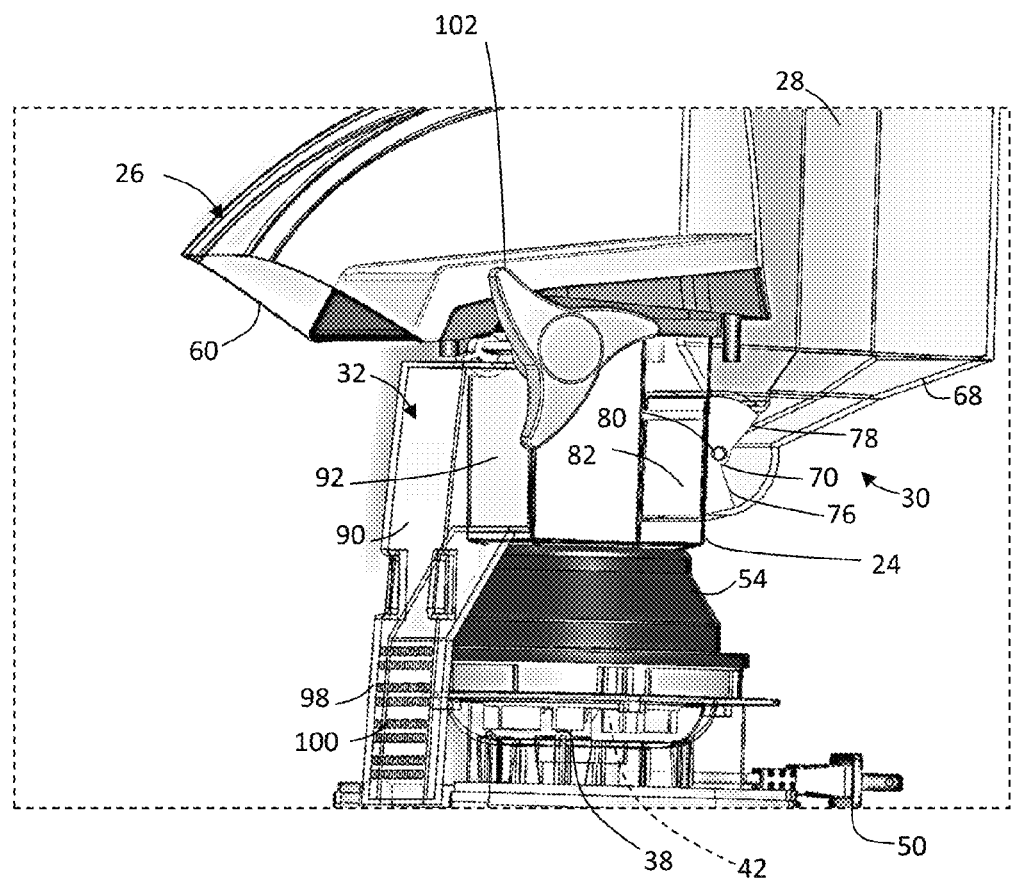
FIG. 5 shows a partial side elevation view of the popping unit with a portion of the housing removed to show internal components of the bypass and seed cleaning assembly.

Making reference to FIGS. 3 and 4, the seed feeding assembly 30 may be arranged under the storage compartment 28. The seed feeding assembly 30 may have a chute 68 that extends from the bottom of the storage compartment 28 through the housing to the popping chamber 24. For ease of illustration, the housing is not shown in FIGS. 3 and 4. The seed feeding assembly may have a scoop 70 disposed in the chute. The seed feeding assembly may comprise a lever or knob 72 for operating the scoop. The scoop 70 may be positioned at the bottom of the chute to receive the kernels directly from the storage compartment 28 through the action of gravity into an open end of the scoop. The scoop 70 enables the user to measure a desired amount of kernels for popping. The scoop 70 may have an interior sized to hold a single or desired serving size of kernels. The scoop 70 may be rotatably disposed in the chute. Accordingly, the chute 68 may be formed with a generally cylindrical shape prior to its entry in the popping chamber 24, and the scoop 70 may rotate within the generally cylindrical shaped portion of the chute. In this arrangement, the amount of kernels to be introduced to the cooking surface and cooking grate may equate to the volume of the scoop taking into account the cylindrical shaped portion of the chute through which the scoop rotates.

The scoop 70 may have an exterior with arcuate surfaces 74 to allow the scoop to rotate in the generally cylindrical shaped portion of the chute. The arcuate surfaces 74 of the scoop may be arranged in a cooperating manner with the chute and the popping chamber to allow the scoop to be open with the either the chute (for instance, when filling the scoop from the storage compartment) or the popping chamber (for instance, when emptying the scoop and directing the kernels to the cooking surfaces and cooking grate). For instance, making reference to FIGS. 3 and 4, as the scoop is rotated in the counter-clockwise position, the leading edge 76 of the scoop moves from a filling position (FIG. 3) in which the leading edge is adjacent to the bottom edge of the chute 68 to close the chute from the popping chamber, to an emptying position (FIG. 4) in which the leading edge rotates away from the bottom edge of the chute to allows kernels in the scoop to flow from the scoop opening into the popping chamber and cooking grate. In the filling position (FIG. 3), a lagging edge 78 of the scoop may be positioned away from the bottom of the chute 68, thereby allowing the kernels in the storage compartment to flow via gravity in to the trough. In the emptying position (FIG. 4), the lagging edge 78 may be positioned adjacent to the bottom of the chute, thereby preventing kernels in the storage compartment 28 from flowing out of the storage compartment down the chute and into the popping chamber. Accordingly, the leading and lagging edges 76,78 of the trough may be geometrically configured to seal and unseal with the chute 68 as desired when the scoop 70 is rotated within the seed feeding assembly 30. The scoop 70 may only oscillate along a small arc segment between filling and emptying positions. For instance, as shown in the drawings, the scoop may rotate less than a quarter turn to allow the scoop to empty its contents into the popping chamber.

The lever arm or knob 72 may be directly coupled to the scoop via an axle 80 that is rotatably connected to side walls of the chute. In this configuration the lever arm or knob may rotate or oscillate the same amount as the scoop as the scoop is moved between the filling and emptying positions. The lever arm or knob may have indicia representative of the filling and emptying positions. The lever arm or knob may include mechanisms to make audible sounds representative of the filling and emptying positions. The lever arm or knob may include mechanisms to restrict its rotary motion to allow movement only between the filling and emptying positions.

The scoop 70 may have a bottom 82 extending between the arcuate surfaces 74 that generally conforms to the interior contour of the popping chamber 24. For instance, as shown in the drawings, the bottom 82 of the scoop is flat and conforms to the side walls of the popping chamber 24. The bottom of the scoop may be other shapes. The bottom of the scoop may form a seal or be tight fitting with the popping chamber and the chute to prevent pressurized, heated air from leaking from the popping chamber into the chute and into the storage container.

The seed cleaning assembly 32 may be arranged on the popping unit opposite the seed feeding assembly 30. The seed cleaning assembly 32 may comprise an un-popped seed bin 90 that is separated from the popping chamber 24 during normal operations by a bypass 92. In normal popping operations, the bypass 92 is positioned in a manner such that pressurized air flows from the blower fan assembly 38, through the cooking grate 56, through the popping chamber 24 and out through the opening 60 of the hood assembly 26. In this way, the popped kernels cooked on the cooking surface 58 and grate 56, expand upward through the popping chamber 24 through the hood assembly 26 and into a serving dispenser. In seed cleaning operations, the bypass 92 is positioned in a manner such that pressurized air flows from the blower fan assembly 38, through the cooking grate 56, and into the un-popped seed bin 90. In this way, un-popped kernels on the cooking surface 58 and grate 56 may be swept into the un-popped seed bin via the pressurized air.

The bypass 92 may comprise a seed bin door positionable in the popping chamber 24. The seed bin door may be pivotally connected to the popping chamber. As shown in the drawings, the seed bin door 92 is pivotally connected to a top portion of the popping chamber. The bypass may also be slidingly movable to control flow between the cooking grate and/or surfaces, and the hood assembly or the un-popped seed bin. In normal operations, the seed bin door 92 may be in a closed position where the door conforms to the interior of the popping chamber and allows pressurized air to flow from the blower unit, through the cooking grate, through the popping chamber and out through the hood assembly. In seed cleaning operations, the seed bin door 92 may be in an open position where the seed bin door extends into the popping chamber 24 to form a seal in the popping chamber otherwise blocking the path through the popping chamber to the hood assembly. In the open position, the seed bin door 92 opens an access 94 in the popping chamber interior which in turn creates a path directing any un-popped seeds from the cooking grate 56 and cooking surface 58 into un-popped seed bin. As shown in the drawings, the path 96 may comprise a portion of the popping chamber. However, the seed bin door may be positioned in the popping unit to enable the un-popped seeds to flow directly from the cooking grate and cooking surfaces to the un-popped seed bin 90. The un-popped seed bin may be positioned in the interior of the housing as best shown in FIG. 1. The un-popped seed bin may have an access door 98 releasably attachable to the housing. The access door 98 allows the user to open the access door, access the un-popped seed bin 90, and clean the un-popped seed bin. The un-popped seed bin access door 98 may have perforations 100 or the seed bin 90 may otherwise be vented to allow pressurized air to exit the un-popped seed bin as will be explained in greater detail below. The un-popped seed bin 90 may be integrally formed with the door 98, for instance, as a container integrally formed with the door. In this configuration, any un-popped seeds are contained in the container as the un-popped seed bin door is removed from the housing thereby facilitating the emptying and the cleaning of the popping unit.

The seed bin door 92 may be rotated between the open ("bypass") position and the closed ("normal") position with a lever 102. The lever may be spring loaded to return the seed bin door to the closed position. The lever may also lock the seed bin door in the open ("bypass") position. A distal end of the seed bin door may cooperate with the interior of the popping chamber to support the seed bin door in the open position. For instance, the seed bin door may snap into a groove formed in the interior of the popping chamber. The lever may be directly coupled to the door via an axle 104 or may be operatively coupled thereto with linkages. The lever may comprise a knob. The axle 104 may be operatively or directly coupled to a peripheral edge of the seed bin door 92, thereby allowing the seed bin door to pivot along its edge between the open ("bypass") and closed ("normal") positions. In the bypass position, the seed bin door 92 may extend across the popping chamber 24 to seal the popping chamber and prevent unwanted or un-popped seeds from exiting through the top of the popping chamber and the hood assembly 26. The seed bin door 92 may act as a deflector to deflect any un-popped seeds through the access 94 into the un-popped seed bin. In seed cleaning operations, the blower fan assembly 38 may be energized. However, the heating element 42 need not be energized. The blower fan may be energized once the bypass is actuated for seed cleaning operations. For instance, the popping unit may energize the blower unit 38 for seed cleaning operations automatically when the seed bin door 98 is rotated to the bypass position. A position switch in the lever or knob, or a switch actuated by the seed bin door 98 may provide signals to actuate the blower fan 38. In the alternative, the user may actuate the blower fan manually once the seed bin door is in the bypass position. For instance, a three position switch may be provided with a position for "off," a position for "blower on," and a position for "blower/heater on." The lever for the seed bin door may have a positional switch such that when the seed bin door is rotated to the open or bypass position, the blower is energized to draw air in through the housing, through the plenum, and through the cooking grate, thereby allowing pressurized air to clean the cooking grate and cooking surface and directing any un-popped kernels into the un-popped seed bin. In operation, the heating element need not be energized so ambient air is drawn into the housing for seed cleaning operations. The air drawn into the housing, blown through the un-popped seed bin may be vented from the un-popped seed bin through perforations in the un-popped seed bin compartment door.

In normal operation, the storage compartment 28 has a volume of un-popped kernels of corn. The un-popped kernels of corn in the storage compartment 28 may slide down the chute 68 to fill the scoop 70. The scoop lagging edge 78 is spaced from the chute 68 to allow seeds to freely flow under gravity from the storage compartment 28 into the chute to fill the scoop. The leading edge 76 of the scoop forms a seal with the chute 68, thereby preventing any seeds from the storage compartment 28 from flowing through the chute into the popping chamber 24. In this position, the flat bottom 82 of the scoop conforms to the interior of the popping chamber forming a virtually seamless or smooth interior in the popping chamber to allow popped kernels to easily flow from the popping chamber to the hood assembly. The seed bin door 92 is in the closed position, thereby also forming a virtually seamless or smooth interior in the popping chamber to allow popped kernels to easily flow from the popping chamber to the hood assembly.

Figure 7:
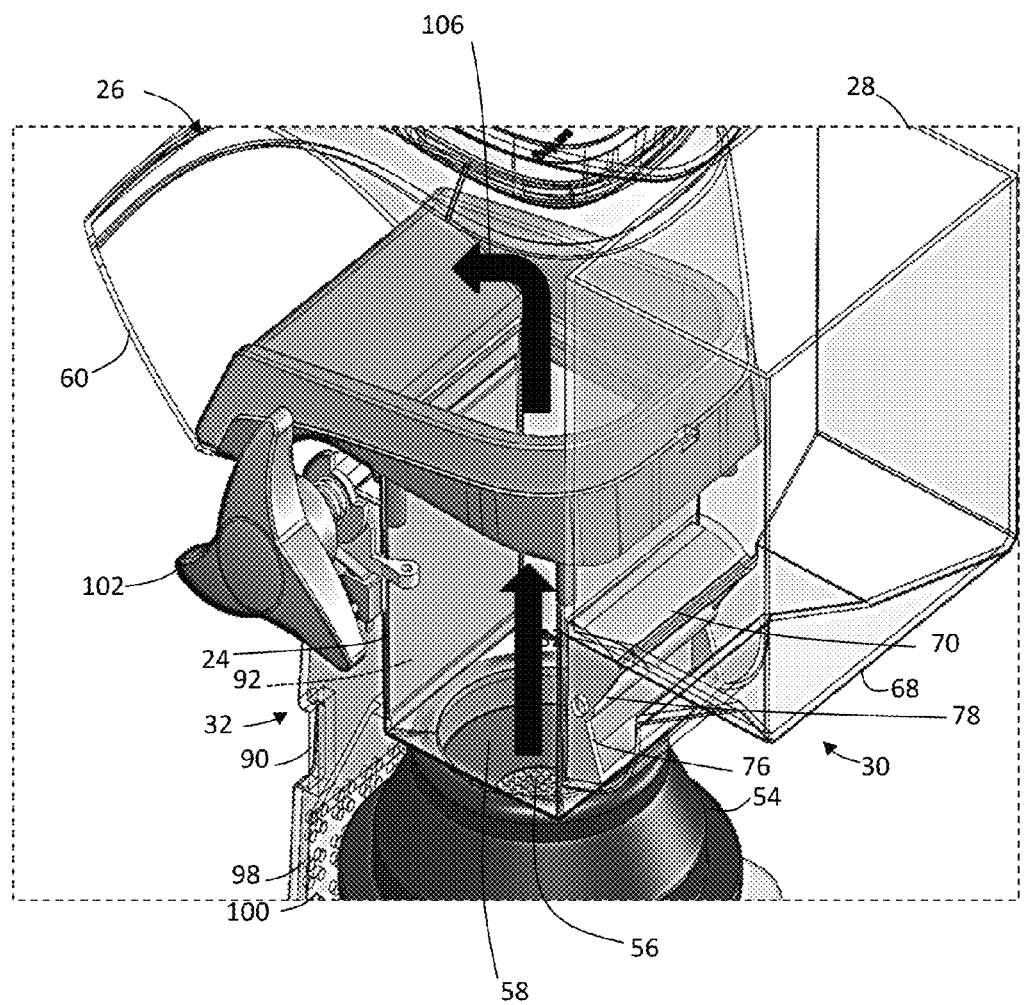
FIG. 7 shows a partial perspective view of the popping unit in a normal popping mode.
Figure 8:
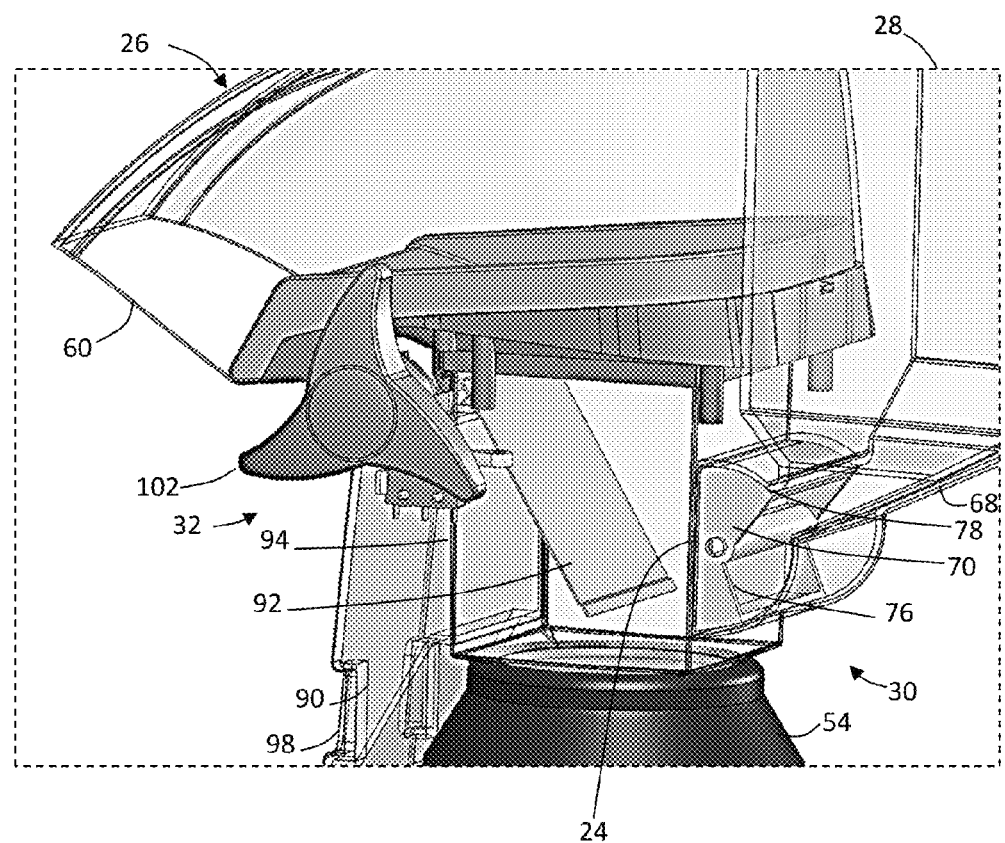
FIG. 8 shows a partial perspective view of the popping unit after normal popping operations have stopped.
Figure 9:
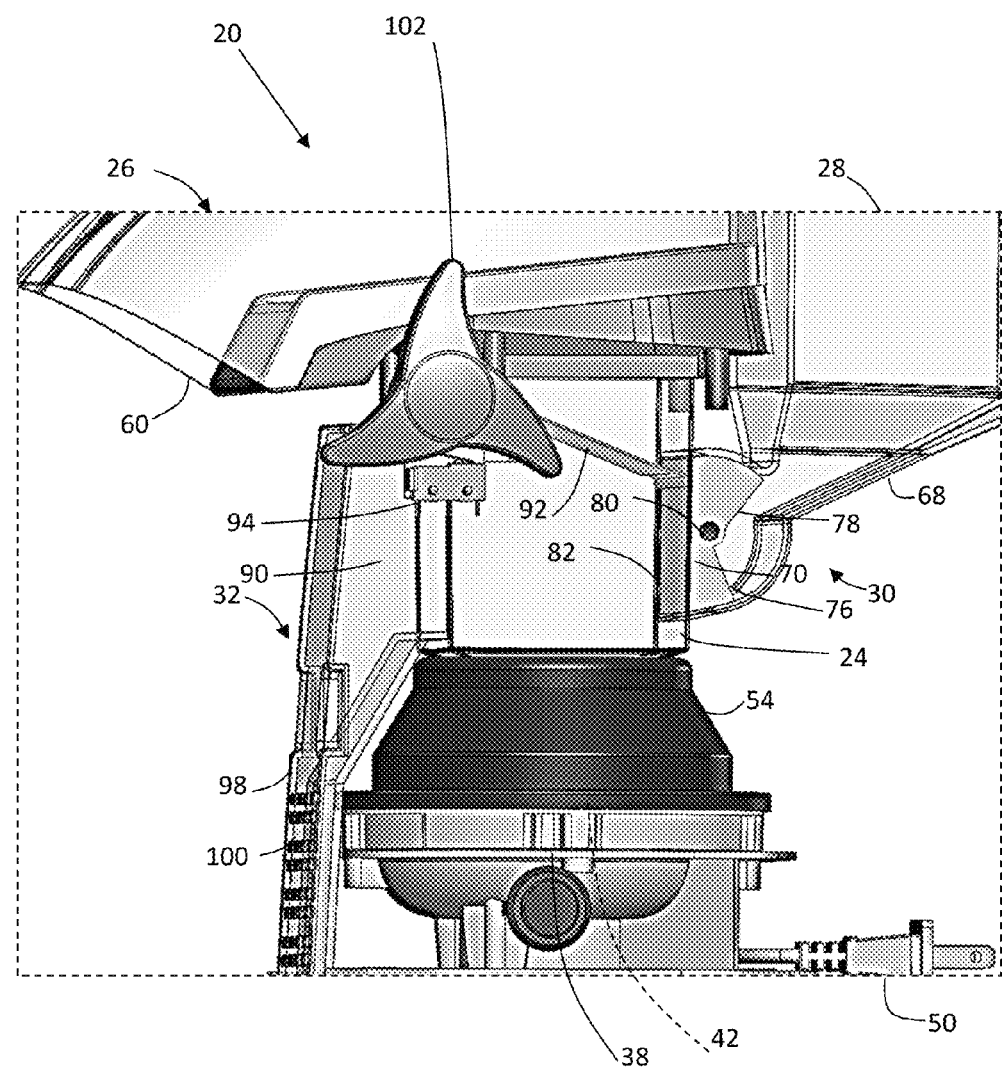
FIG. 9 shows a partial side elevation view of the popping unit during seed cleaning operations with a handle to the seed feeding assembly removed for ease of illustration.
Figure 10:
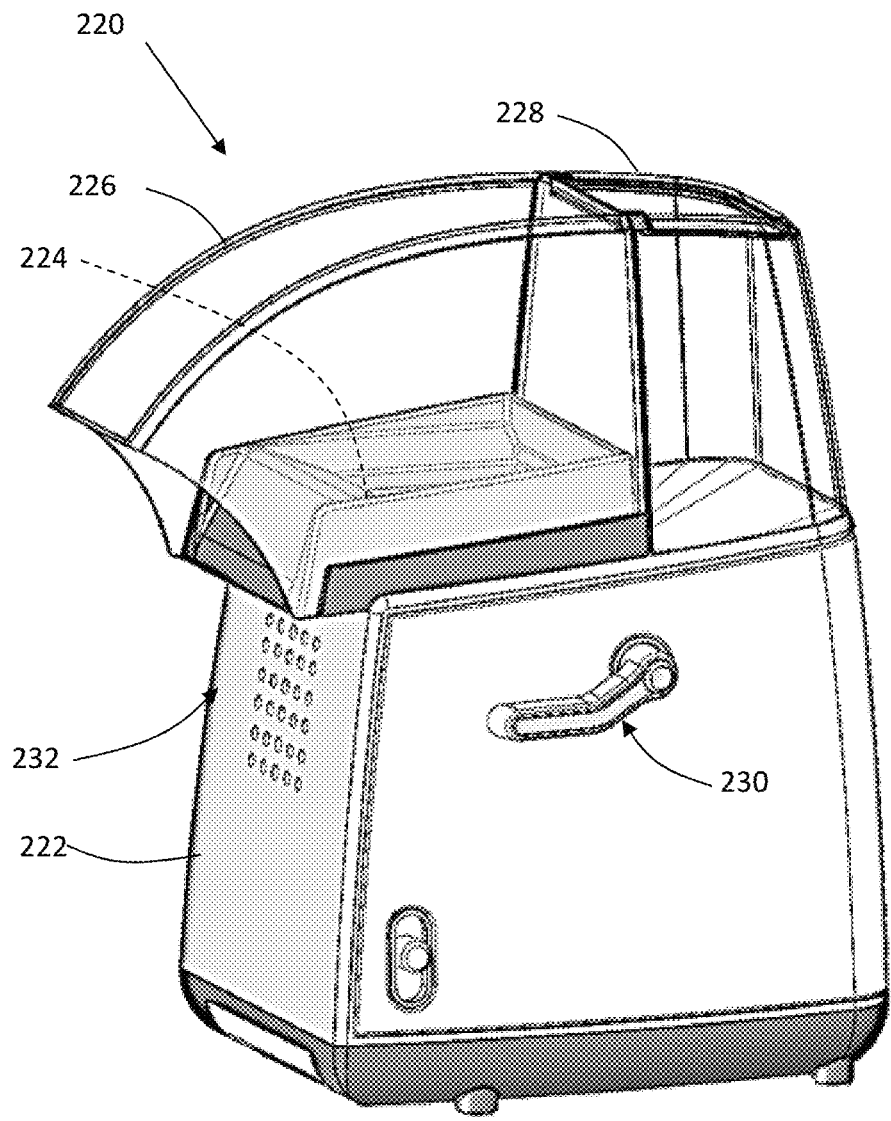
FIG. 10 shows a perspective view of another embodiment of a popping unit.

To begin popping operations, the scoop 70 is rotated counter-clockwise (FIGS. 3 and 4) such that the scoop lagging edge 78 forms a seal with the chute 68 and the scoop leading edge 76 rotates to a position that it clears the chute enabling the scoop opening to communicate with the popping chamber 24 and allowing seeds to flow out of the scoop into the popping chamber. Once the scoop 70 has been emptied into the popping chamber, the user may release the scoop lever 72. The scoop lever 72 may spring return to a position such that the leading edge 76 of the scoop 70 forms a seal with the chute 68 and the lagging edge 78 of the scoop moves away from the chute to allow seeds to flow from the storage compartment through the chute into the scoop. At this point, the user may actuate the popping unit by depressing the switch 50. Depressing the switch activates the blower fan 38 and the heating element 42. Air is drawn in through the housing interior from the blower fan, passed over the heating element 42, and heated. The hot air passes over the cooking grate 56 and cooking surfaces 58, thereby cooking the kernels. The popped kernels expand through the popping chamber 24 out through the hood assembly 26 and into a serving dispenser. FIG. 7 shows the path 106 of the kernels during normal cooking operations.

Figure 6:
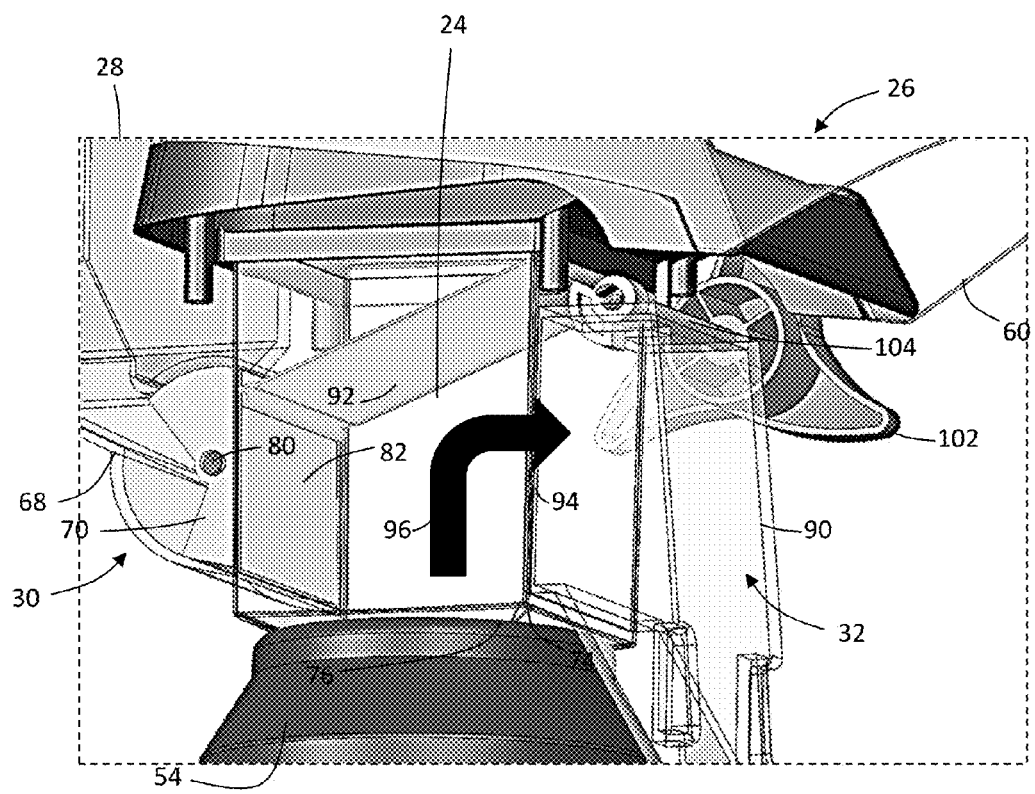
FIG. 6 shows a partial perspective view of the bypass and seed cleaning assembly.

Once popping operations are complete, the user may de-energize the popping unit by actuating the switch 50. In embodiments where the popping unit has a timer, popping operations may be automatically completed upon expiration of the timer. To clean the popping unit, the user may rotate the seed bin door lever 102 to the bypass position. Once the seed bin door lever is in the bypass position, the blower fan 38 may automatically actuate. The blower fan may actuate at a low speed or the normal speed. In the seed cleaning mode, the heating element 42 need not energize, so the air that is drawn in by the blower into the popping unit housing interior is at ambient temperature. The air drawn in by blower fan 38 is directed across the cooking grate 56 and cooking surfaces 58. The air may flow partly into the popping chamber 24 (for instance as shown in FIG. 6) and through the access 94 into the un-popped seed bin 90. The flow clears any un-popped seeds from the cooking surface and cooking grate into the un-popped seed bin. The air flowing into the un-popped seed bin 90 exits the popping unit through perforations 100 formed in the un-popped seed bin access door 98. After cleaning operations are complete, the unit may again be de-energized. The un-popped seed bin access door 98 may be opened and any un-popped seeds may be removed from the un-popped seed bin 90.

FIGS. 10-15 show an alternate embodiment of a popping unit 220. Many of the components of the popping unit 220 are similar to those previously described. For the sake of brevity, they will not be addressed herein unless they differ significantly from those previously described. Generally speaking, the popping unit 220 includes a housing 222 that defines the hollow interior of the popping unit. The popping unit 220 has a popping chamber 224 which may be arranged within the housing 222. A hood assembly 226 may be positioned at an open top end of the popping chamber and releasably connected therewith and/or the housing 222. The popping unit has a storage compartment 228 for unpopped kernels. As shown in the drawings, the seed storage compartment 228 may be located opposite the opening of the hood assembly. The storage compartment 228 may be formed of a clear plastic material to allow the user to visual the level of seed stored in the storage compartment. A seed feeding assembly 230 directs unpopped kernels from the storage compartment to the cooking surfaces of the popping unit. A seed cleaning assembly 232 may be arranged in the housing interior opposite the seed feeding assembly 230.

In the interior of the housing is a blower fan assembly 238 and a heating element 242 that are disposed in the housing hollow interior. The blower fan and/or heating element may be de-energized with a switch assembly located 252 on the housing. Through the action of the blower fan 238, ambient air is drawn into the hollow interior through openings in the housing bottom. Heated air flows through the popping chamber 224 to the hood assembly 226 and out through an opening in the hood assembly. In this way, the pressurized heated air pushes popped kernels away from the cooking surfaces in the popping chamber, allowing other unpopped kernels to be positioned on the cooking surface and cooking grate.

FIGS. 11-15 provide additional detail of the seed feeding assembly 232 and a scoop 270 positioned in a chute 268 under the seed storage compartment 228. The scoop 270 may be rotatably disposed in the chute 268 and operatively connected to a lever arm 272. The lever arm 272 may be operatively connected to a gearing system 273 which drives the scoop 270 in a pivoting manner about an axle 280 defining an axis of rotation of the scoop in the chute 268. As discussed previously, the scoop 270 may be sized to meter an amount of kernels to the cooking surface based upon a serving size. The chute 268 may have a smooth transition area 274 adjacent to the scoop and the transition area 274 may be curved to facilitate delivery of the kernels down the shoot into the scoop. The curved transition area 274 in the chute may reduce the likelihood of kernels becoming jammed in the chute between the chute and the scoop 270.

Figure 15:
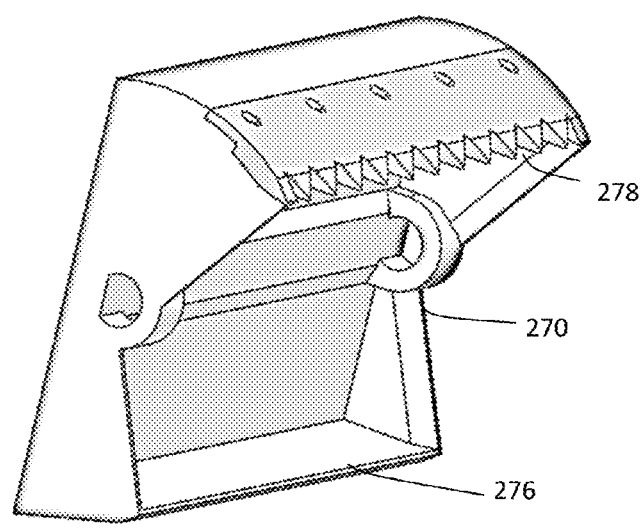
FIG. 15 shows a perspective view of a scoop of the popping unit of FIG. 10.

As shown in FIG. 15, the scoop has a leading edge 276 and a lagging edge 278. The lagging edge 278 which may be formed with teeth or serrations. The lagging edge teeth or serrations may be formed of a resilient material, which may be rubber or silicone. Forming the lagging edge 278 with teeth or serrations and forming the teeth or serration from a resilient material reduces resistance in the chute 268 as the scoop 270 is pivoted therein, and assists in reducing the possibility of kernels jamming the scoop during operation.

Figure 11:
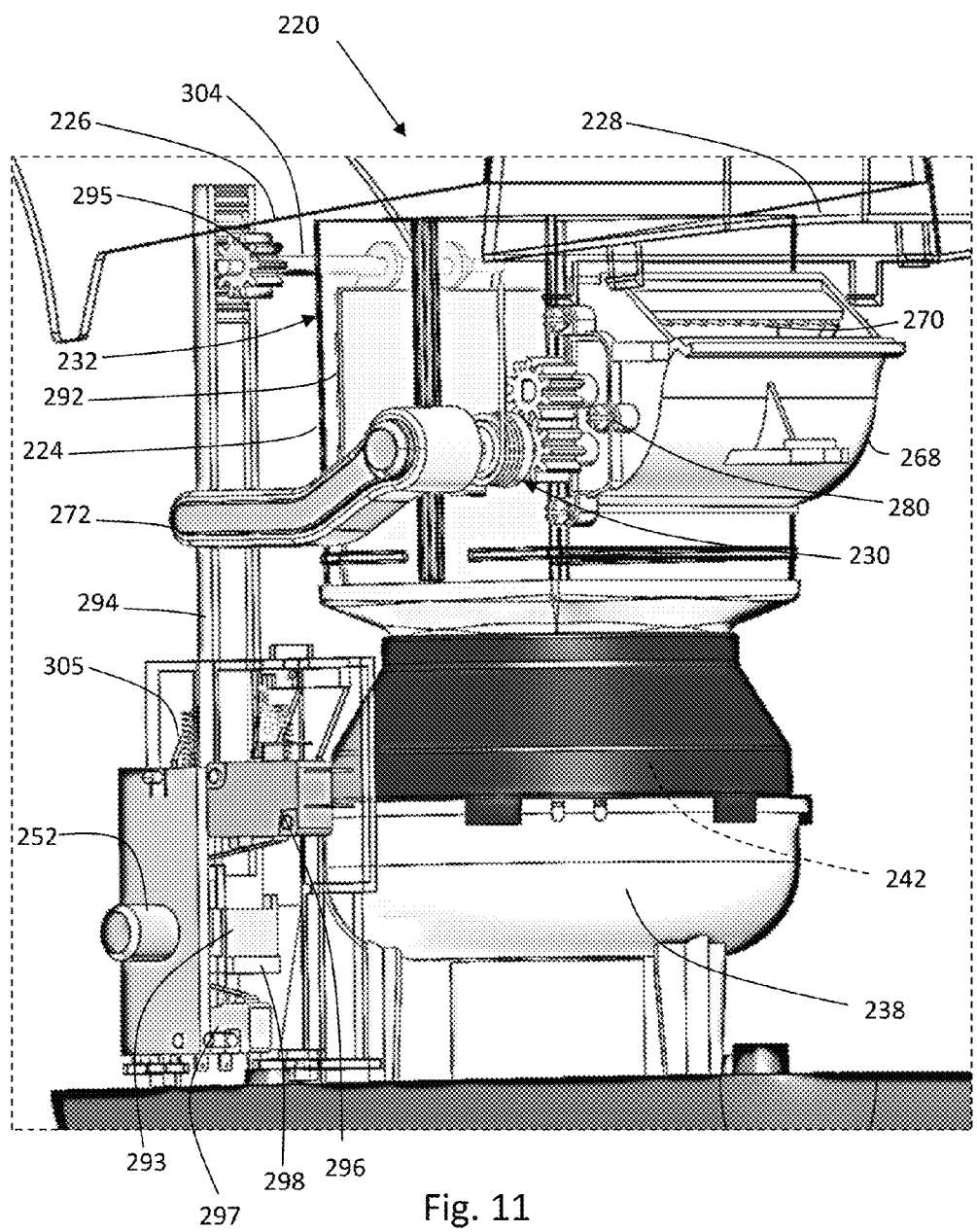
FIG. 11 shows a rear perspective view of the popping unit of FIG. 10 with a housing of the popping unit removed for ease of illustrating components of the popping unit.
Figure 12:
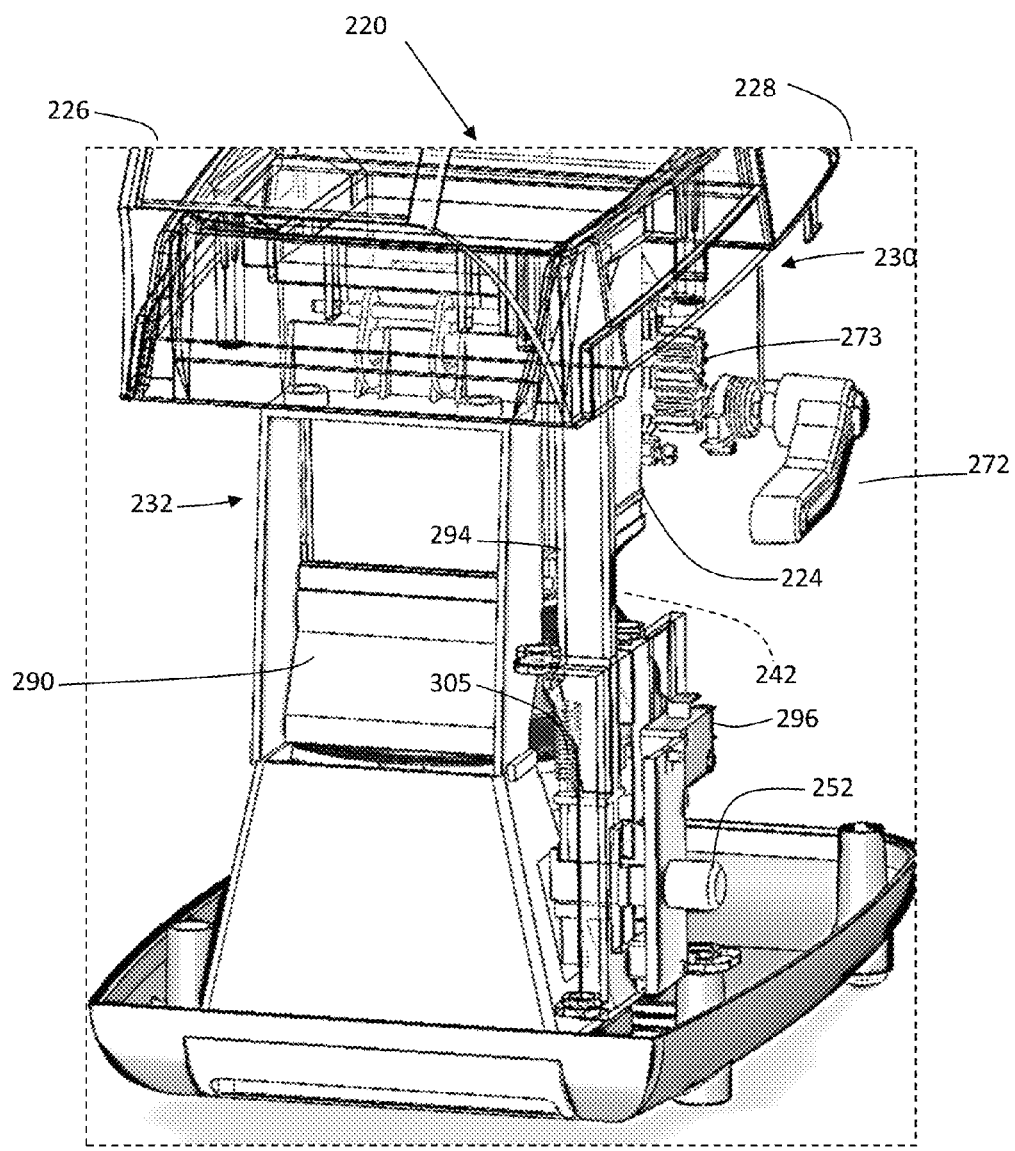
FIG. 12 shows a front perspective view of the popping unit of FIG. 10 with the housing removed for ease of illustrating components of the popping unit.
Figure 13:
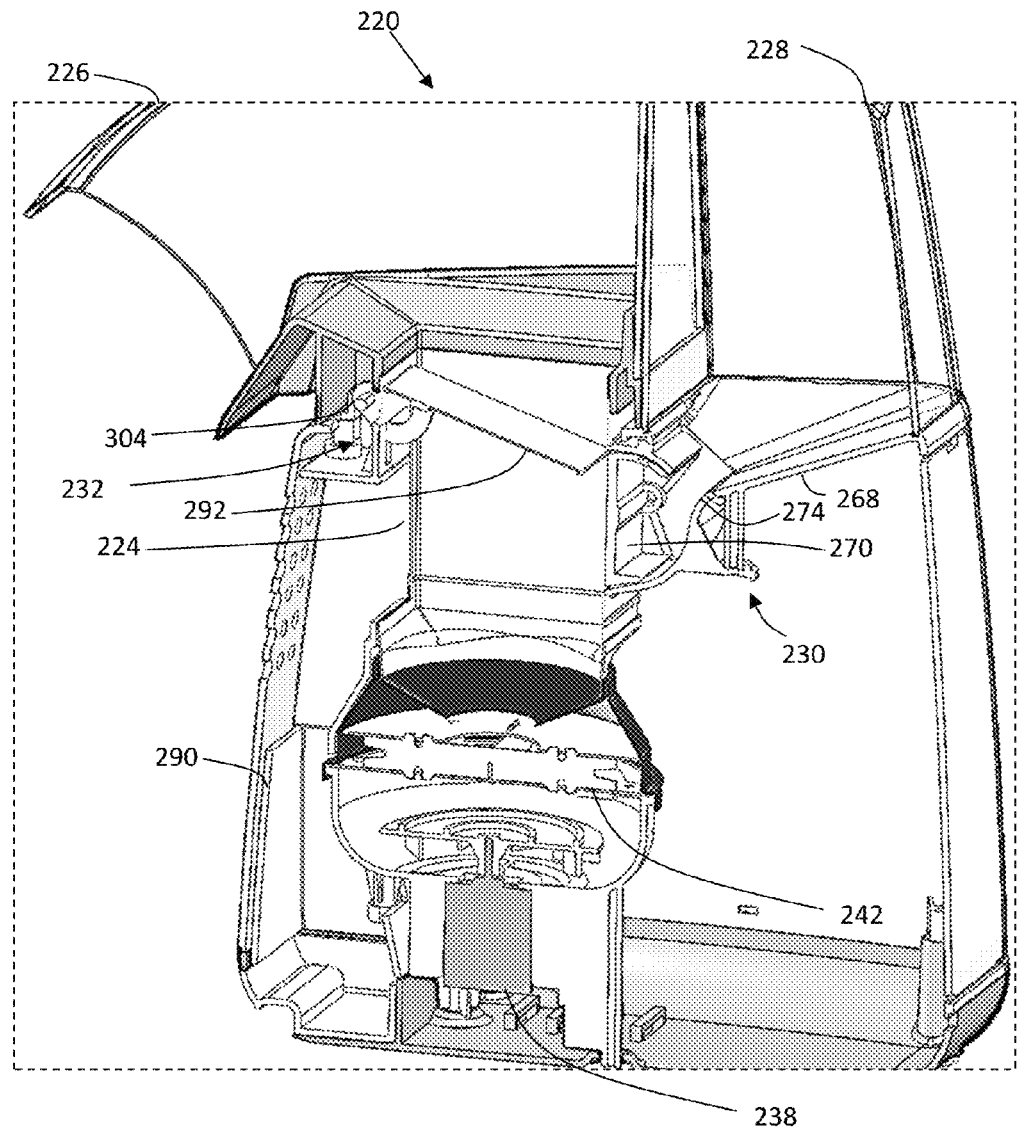
FIG. 13 shows a side perspective, cross sectional view of the popping unit of FIG. 10 with the housing removed for ease of illustrating components of the popping unit.
Figure 14:
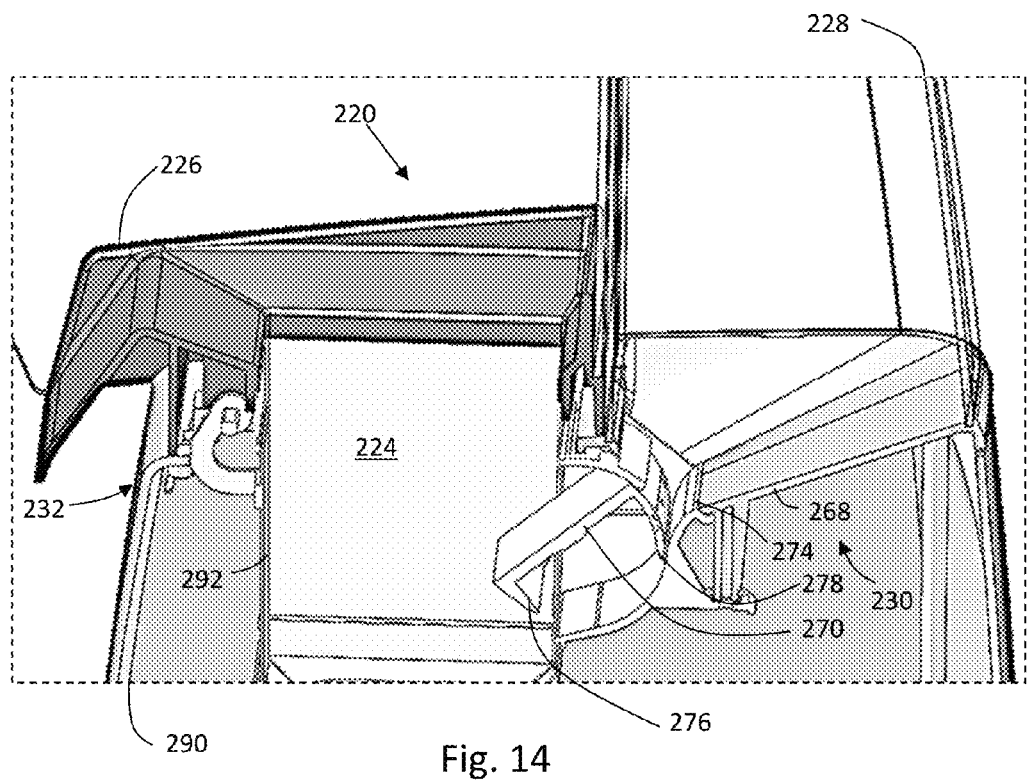
FIG. 14 shows a side perspective, and cross sectional view of a seed storage compartment and a popping vessel of the popping unit of FIG. 10 with the housing removed for ease of illustrating components of the popping unit.

The seed cleaning assembly 232 may be arranged on the popping unit 220 opposite the seed feeding assembly 230. The seed cleaning assembly 232 may comprise an unpopped seed bin 290 that is separated from the popping chamber during normal operations by a bypass 292. To align the seed cleaning bin 292 with the popping vessel or popping chamber 224, the bypass 292 is positionable across the normal opening of the popping chamber to divert the flow of pressurized air into the unpopped seed bin 290. In the embodiment of the popping unit 220 shown in FIGS. 10-15, the switch assembly 252 may include an actuator 293 that is mechanically linked to the bypass 292 with a rack 294 and pinion gear 295. The rack 294 extends vertically in the drawings from the switch assembly 252 to pinion gear 295. As best shown in FIGS. 11 and 12, the switch assembly 252 has three positions. The middle position is an off position. In the most vertically upward position (i.e., the normal popping mode), the actuator 293 of the switch assembly engages a switch 296 which energizes the blower fan 238 and the heating element 242 for normal popping operations. In the most vertically downward position, the actuator 293 of the switch assembly engages a switch 297 that energizes the blower fan 238 for seed cleaning operations. In the most vertically downward position (i.e., the cleaning mode), the blower unit 238 is energized but the heating element 242 is not such that pressurized air may flow through the blower unit in the popping chamber through the bypass 292 into the seed cleaning bin 290. The rack 294 and switch assembly 252 is configured to allow vertical motion of the switch actuator 293 upward to engage the switch 296 for the normal popping mode without movement of the rack. The switch actuator 293 has a slot and the rack 294 is configured to slide in the slot of the arm. With upward movement of the switch assembly, the switch actuator freely slides along the rack (with the rack in the slot) to the required vertical position to energize the switch 296 for energizing the blower 238 and heating element 242. With downward movement of the switch assembly 252, the switch actuator engages a flange 298 on a distal end of the rack 294. Vertically downward motion drives the rack vertically downward to the required vertical position to energize the switch 297 for energizing the blower 238 only. Vertically downward motion also drives the rack 294 vertically downward to rotate the pinion gear 295 (counter-clockwise rotation in FIG. 11). This in turn pivots the bypass 292 across the popping vessel or popping chamber 224. The pivot connection comprises an axle 304 which is driven by the rack 294 and the pinion gear 295. The switch assembly may have a spring 305 to return the switch actuator 293 to the neutral off position from the most vertically downward position during seed cleaning operations. The spring 305 moves the rack 294 upward in the drawings and causes rotation of the pinion gear 295 to reposition the bypass 292 to seal the popping chamber 224 for normal popping operations. In such an arrangement, to maintain the bypass 292 in the bypass position for seed cleaning operations, the switch assembly 252 must be held by the user in the vertically for cleaning operations and released when cleaning operations are finished. The spring may be omitted and the user may return the switch assembly to the neutral position manually thereby manually repositioning the rack and the pivoting the bypass to the normal position. Another pivot mechanism may also be provided to position the bypass across the popping chamber.

Figure 16:
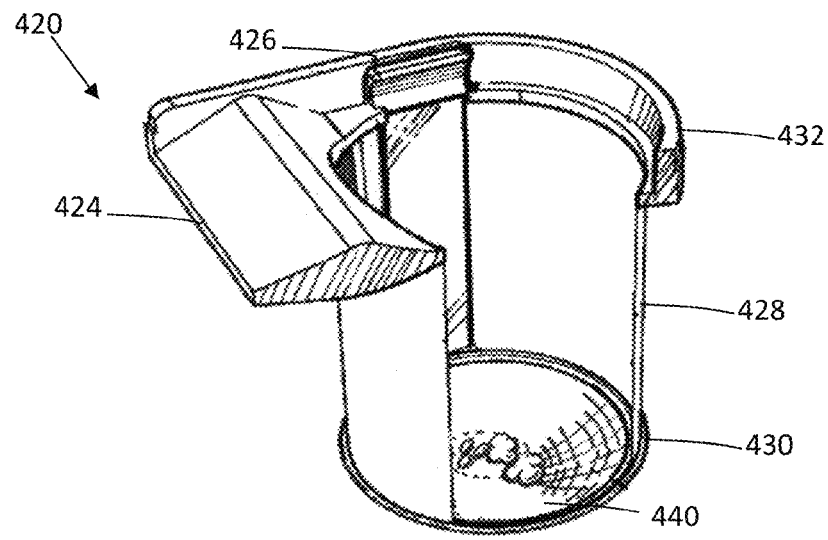
FIG. 16 shows a partial, cross-section view of an alternate embodiment of a popping vessel of a popping unit configured for mechanical removal of un-popped kernels.
Figure 17:
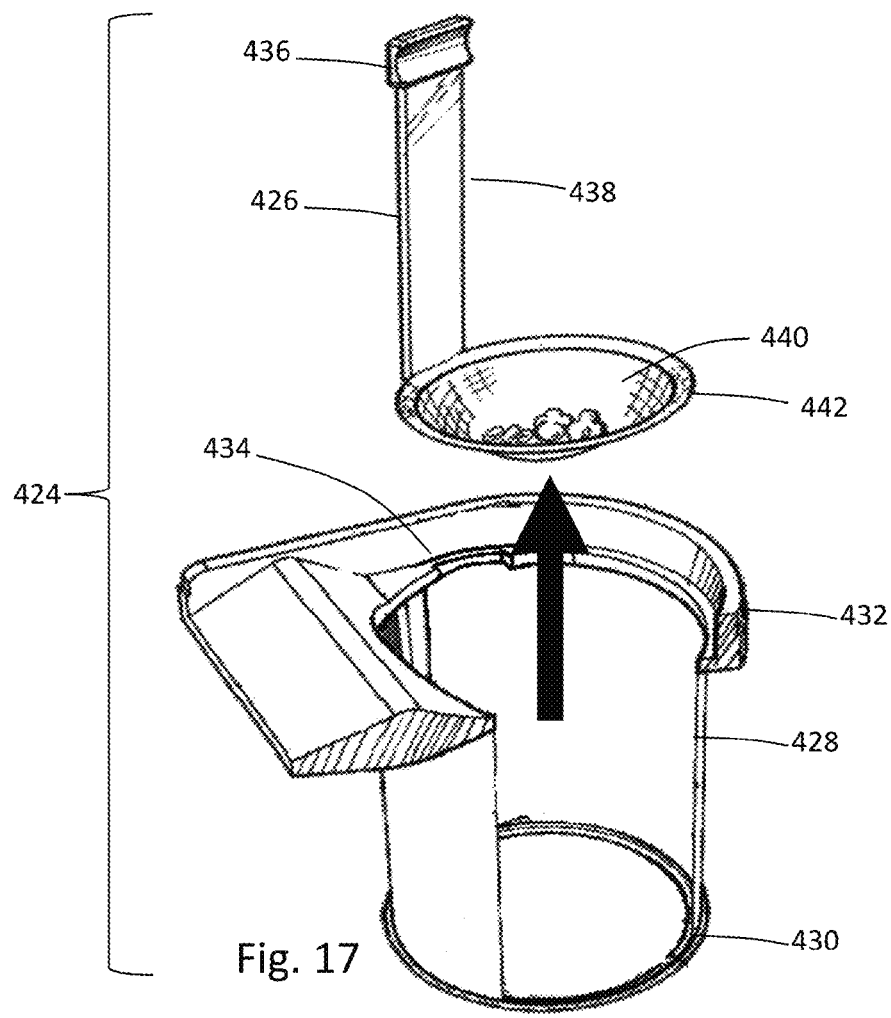
FIG. 17 shows an exploded view of the popping vessel of the popping unit of FIG. 16.

FIGS. 16 and 17 show an alternate embodiment of a popping unit 420 and a popping chamber assembly 424 therefor. In the popping unit 420 associated with the popping chamber assembly 424 of FIGS. 16 and 17, the popping unit uses mechanical seed cleaning methods rather than the automatic seed cleaning methods described previously. The popping chamber assembly 424 is shown with a portion cut-way for ease of illustration. The popping chamber assembly 424 includes a ladle member 426 which is positioned in the popping chamber 428 above the heated air plenum 430 associated with the popping unit. The popping chamber 428 comprises a cylindrical tubular member with a hollow interior and open axial ends. The bottom axial end is position over the heated air plenum 430 and the top end exits to a hood assembly. The ladle member 426 is removably attached to the popping chamber 428 and may be removed from the popping chamber by the user to clean and remove unwanted kernels from the popping unit. A rim 432 around the top open end of the popping chamber 428 may have a notch 434 to releasably secure the ladle member 426 to the popping chamber 428. The rim 432 may define the transition of the popping chamber to the hood assembly and the opening of the hood. The ladle member comprises a tab 436 with a depending arm 438 extending to a screen portion 440. The screen portion 440 may contain the kernels. The kernels may be delivered to the popping chamber and located on the screen portion 440 via the seed feeding mechanisms previously described. In the alternative, the seeds may be manually introduced to the popping chamber and located on the screen portion 440. For instance, the user may detach the hood assembly from the popping chamber exposing the inside of the popping chamber and allowing the user to place seeds for popping on the screen portion 440 of the ladle member 426. The ladle member screen portion 440 may have a flexible outer rim 442 to allow the screen portion to conform to the bottom opening of the popping chamber adjacent to the heated air plenum 430. The screen portion 440 may form the cooking surfaces associated with the popping unit 420. The screen portion 440 allows heated and pressurized air to flow through the screen portion to pop the kernels and direct the popped kernels through the popping chamber and out through the top opening and into the hood assembly. Once popping operations are completed, the hood assembly may be detached from the popping chamber assembly 424 to expose the inside of the popping chamber 428 and the ladle member tab 436. The ladle member tab 436 may then be released from the notch 434 in the rim 432 and lifted vertically upward. Unpopped kernels collected on the screen portion 440 may be removed from the popping chamber. Once the kernels are removed and discarded, the ladle member 426 may be repositioned in the popping chamber for future use with the tab 436 engaged in the notch 434 and the screen portion 440 positioned over the heated air plenum 430.

In view of the foregoing, it will be seen that the several advantages are achieved and attained. The embodiments were chosen and described in order to best explain a practical application to thereby enable others skilled in the art to best utilize the principles herein in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A popcorn popping unit having:
a housing including: (i) a heating element and a blower fan, (ii) a cooking surface adapted to received kernels of corn, (iii) a popping chamber into which popcorn enters after being popped, the popping chamber having an inlet and an outlet, the popping chamber inlet being adjacent to the cooking surface, the popping chamber outlet being spaced from the popping chamber inlet, the popping chamber having a bypass selectively movable between a first and a second positions within the popping chamber to establish two flow paths of pressurized air through the popping unit, and (iv) a seed collection bin disposed in the housing separate from the popping chamber; and
wherein in the first position of the bypass for one of the flow paths, the bypass is positioned within the popping chamber to allow pressurized air to flow over the heating element, flow over the cooking surface, and flow from the popping chamber inlet through the popping chamber outlet, and to move popped kernels of popcorn from the popping chamber outlet to a serving dispenser;
wherein in the second position of the bypass for the other of the flow paths, the bypass is positioned within the popping chamber to block the popping chamber outlet such that pressurized air flows over the cooking surface, flows from the popping chamber inlet into the popping chamber and to the seed collection bin, and moves un-popped seeds into the seed collection bin.

2. The popcorn popping unit of claim 1, wherein the seed collection bin is vented.

3. The popcorn popping unit of claim 1, further comprising a seed storage compartment.

4. The popcorn popping unit of claim 3, wherein the seed storage compartment has a chute that directs seeds from the storage compartment to the cooking surface.

5. The popcorn popping unit of claim 4, wherein the chute has an inlet that receives seed from the seed storage compartment and an outlet that directs seeds from the storage compartment to the cooking surface.

6. The popcorn popping unit of claim 5, further comprising a scoop in the chute.

7. The popcorn popping unit of claim 6, wherein the scoop is moveable in the chute between a first position in which the scoop receives seed from the chute inlet and a second position in which the scoop empties its contents to the cooking surface.

8. The popcorn popping unit of claim 6, wherein the scoop is rotatably disposed in the chute.

9. The popcorn popping unit of claim 6, wherein the scoop has a bottom surface and sides extending around the bottom surface that define an open top opposite the bottom.

10. The popcorn popping unit of claim 9, wherein the open top cooperates with the chute in the first position to receive seed from the chute inlet.

11. The popcorn popping unit of claim 10, wherein the open top cooperates with the chute in the second position to block seed from chute inlet.

12. A popcorn popping unit with a blower unit and a popping chamber, the blower unit having a heating element and a blower fan, the blower unit being adapted to direct pressurized air into the popping chamber, the popping chamber having a hollow interior with a proximal end receiving the pressurized air from the blower unit and a distal end opposite the proximal end, the popping unit having a bypass, the bypass being selectively movable between a first and a second positions within the popping chamber to establish first and second flow paths of pressurized air through the popping unit;

wherein in the first position of the bypass for the first flow path, the bypass cooperates with the popping chamber to allow the pressurized air to flow to the through the popping chamber to the popping chamber distal end; and wherein in the second position of the bypass for the second flow path, the bypass obstructs the pressurized air flowing through the popping chamber to the popping chamber distal end, and redirects the pressurized air to a seed collection bin disposed in the blower unit separate from the popping chamber.

13. The popcorn popping unit of claim 12, wherein movement of the bypass to the second position forms an opening to the seed collection bin.

14. The popcorn popping unit of claim 12, wherein movement of the bypass to the second position energizes the blower.

15. The popcorn popping unit of claim 12, wherein the seed collection bin is vented.

16. The popcorn popping unit of claim 12, wherein the bypass pivots relative to the popping chamber interior.

17. The popcorn popping unit of claim 12, further comprising a seed storage compartment.

18. The popcorn popping unit of claim 17, wherein the seed storage compartment has a chute that communicates with the popping chamber.

19. The popcorn popping unit of claim 18, further comprising a scoop in the chute.

20. The popcorn popping unit of claim 19, wherein the scoop is moveable in the chute between a first position in which the scoop receives seed from the chute inlet and a second position in which the scoop empties its contents to the cooking surface.

21. The popcorn popping unit of claim 20, wherein the scoop is rotatably disposed in the chute.

22. The popcorn popping unit of claim 21, wherein the scoop has a bottom surface and sides extending around the bottom surface that define an open top opposite the bottom.

23. The popcorn popping unit of claim 22, wherein the open top cooperates with the popping chamber to allow seed to flow from the scoop to the cooking surface in the second position.

24. The popcorn popping unit of claim 22, wherein the open top cooperates with the chute outlet to direct the flow of seeds from scoop and chute outlet to the popping chamber interior in the first position.

25. The popcorn popping unit of claim 22, wherein the scoop bottom surface defines a portion of the interior the popping chamber with the scoop in the first position.

\* \* \* \* \*